(12) United States Patent
Gozdalik et al.

(10) Patent No.: US 12,111,796 B2
(45) Date of Patent: Oct. 8, 2024

(54) SYSTEM AND METHOD FOR MAINTAINING A COMPREHENSIVE CATALOG OF HIERARCHICAL FILE DATA

(71) Applicant: Starfish Storage Corporation, Waltham, MA (US)

(72) Inventors: Marcin W. Gozdalik, Warsaw (PL); Marcin Barczynski, Warsaw (PL); Stanislaw K. Skonieczny, Warsaw (PL); Dariusz Dzialak, Warsaw (PL); Douglas H. Hughes, Pipersville, PA (US); Bradley C. Elkin, Mendota Heights, MN (US); Michal K. Albrycht, Warsaw (PL)

(73) Assignee: Starfish Storage Corporation, Waltham, MA (US)

(*) Notice: Subject to any disclaimer, the term of this patent is extended or adjusted under 35 U.S.C. 154(b) by 0 days.

(21) Appl. No.: 18/210,493

(22) Filed: Jun. 15, 2023

(65) Prior Publication Data
US 2023/0409541 A1    Dec. 21, 2023

Related U.S. Application Data

(60) Provisional application No. 63/353,686, filed on Jun. 20, 2022.

(51) Int. Cl.
*G06F 16/185* (2019.01)
*G06F 16/14* (2019.01)
(Continued)

(52) U.S. Cl.
CPC .......... *G06F 16/185* (2019.01); *G06F 16/148* (2019.01); *G06F 16/164* (2019.01); *G06F 16/1734* (2019.01)

(58) Field of Classification Search
None
See application file for complete search history.

(56) References Cited

U.S. PATENT DOCUMENTS

| 8,078,653 B1 | 12/2011 | Bisson et al. |
| 2017/0277602 A1* | 9/2017 | Kumar ................. G06F 16/164 |

(Continued)

OTHER PUBLICATIONS

Yadav, D. et al.; Architecture for Parallel Crawling and Algorithm for Change Detection in Web Pages; IEEE; Dec. 17-20, 2007; Rourkela, India; DOI: 10.1109/ICIT.2007.64; last accessed Jun. 19, 2023; https://ieeexplore.ieee.org/abstract/document/4418309.

(Continued)

*Primary Examiner* — Amresh Singh
(74) *Attorney, Agent, or Firm* — Davis, Malm & D'Agostine, P.C.; Richard L. Sampson

(57) ABSTRACT

A system and method for maintaining a comprehensive catalog of metadata records that describes hierarchical file data held in one or more file systems includes a Modular Change Processor (MCP) that captures event notifications pertaining to contents of affected directories within the file systems, coalesces the translated event notifications, and transmits to the catalog, instructions to mark metadata corresponding to the affected directories as 'out-of-sync'. An Enumerator Computer (EC) receives from the catalog, identities of directories having metadata marked 'out-of-sync'; receives from the file systems, updated contents of the 'out-of-sync' directories; generates replacement metadata for the updated contents; and sends the replacement metadata to the catalog, optionally with instructions to replace the metadata marked 'out-of-sync' with corresponding replacement metadata and to mark the replacement metadata as 'in-sync'.

26 Claims, 3 Drawing Sheets

(51) Int. Cl.
    *G06F 16/16*     (2019.01)
    *G06F 16/17*     (2019.01)

(56) References Cited

U.S. PATENT DOCUMENTS

| | | |
|---|---|---|
| 2018/0189369 A1 | 7/2018 | Baek et al. |
| 2018/0285382 A1 | 10/2018 | Mehta et al. |
| 2021/0360066 A1 | 11/2021 | Karumbunathan et al. |

OTHER PUBLICATIONS

Cho, J. et al.; Parallel Crawlers; WWW '02: Proceedings of thee 11th Internatinoal Conference on World Wide Web; May 7, 2002; pp. 124-135; last accessed Jun. 19, 2023; https://dl.acm.org/doi/abs/10.1145/511446.511464.

Shmueli, E. et al.; Framework for Scalable File System Metadata Crawling and Differencing; Journal of Grid Computing; 16, 445-457 (2018); May 17, 2017; DOI 10.1007/s10723-017-9400-8; last accessed Jun. 19, 2023: https://link.springer.com/article/10.1007/s10723-017-9400-8.

Bisson, T. et al.; Designing a fast file system crawler with incremental differencing; ACM SIGOPS Operating Systems Review, vol. 46, Issue 3; Dec. 18, 2012; pp. 11-19; NetApp, Inc.; https://doi.org/10.1145/2421648.2421652; last accessed Jun. 19, 2023; https://dl.acm.org/doi/abs/10.1145/2421648.2421652.

Paul, A. K. et al.; Efficient Metadata Indexing for HPC Storage Systems; IEEE; 2020 20th IEEE/ACM International Symposium on Cluster, Cloud and Internet COmputing (CCGRID); May 11-14, 2020; DOI: 10.1198/CCGrid49817.2020.00-77; Melboune VIC, Australia; https://ieeexplore.ieee.org/abstract/document/9139660.

Liu, L. et al.; SmartScan: Efficient Metadata Crawl for Storage Management Metadata Querying in Large File Systems; Parallel Data Laboratory, Carnegie Mellon University; Pittsburgh, PA; CMU-PDL-10-112, Oct. 2010; pp. 1-19; https://www.pdl.cmu.edu/PDL-FTP/Storage/CMU-PDL-10-112.pdf.

Paul, A. K. et al; FSMonitor: Scalable File System Monitoring for Arbitrary Storage Systems; IEEE; 2019; 978-1-7281-4734-5/19; pp. 1-11.

Rodriguez, Kari, Authorized Officer, ISA/US, International Search Report and Written Opinion mailed Sep. 29, 2023 for related application PCT/US23/25557, and citations cited therein.

\* cited by examiner

SYSTEM AND METHOD FOR MAINTAINING A COMPREHENSIVE CATALOG OF HIERARCHICAL FILE DATA

RELATED APPLICATION

This application claims the benefit of U.S. Provisional Patent Application Ser. No. 63/353,686, entitled System and Method for Maintaining a Comprehensive Catalog of Hierarchical File Data, filed on Jun. 20, 2022, the contents of which are incorporated herein by reference in their entirety for all purposes.

BACKGROUND

Technical Field

This invention relates to file storage systems and to a mechanism for maintaining catalogs of information (metadata) that describe and classify files held in these systems. More specifically the invention includes a mechanism that keeps the catalogs up to date without the need to crawl entire file systems to enumerate their contents.

Background Information

Catalogs of information may be kept up to date by using a file system crawler to repeatedly and exhaustively enumerate the contents of the catalogs. This process may be acceptable for relatively small catalogs but may be too slow and require too much processing overhead for use in applications involving relatively large catalogs.

Attempts have been made to improve the speed of crawling large file systems, such as described in SmartScan: Efficient Metadata Crawl for Storage Management Metadata Querying in Large Filesystems, by Liu et al, Carnegie Mellon University, October 2010, which discusses techniques for efficient crawling when dealing with very large filesystems. This approach uses history of recent modifications to directories in two dimensions, temporal and spatial, and statistical analysis, to target these directories for more frequent scans while reducing scanning elsewhere. This approach may be effective in some applications but generally misses new project areas that spring into existence that are neither temporally nor spatially collocated with previous areas (it doesn't know what it doesn't know).

Other approaches focus on parallelizing scans which may work well up to a point, but tend to break down at extreme scale and may have significant adverse impacts on the targets being scanned. The more parallelism in threads and nodes, the more the targeted storage device may be impacted by requests for information. When the act of updating the catalog has adverse effects to others attempting to read and write files or objects (the primary use case), then conventional storage devices will disable updates to preserve primary utility.

It may also be possible to improve the efficiency of maintaining a catalog by implementing targeted crawling and/or by ingesting events directly, but these tend to have difficulty handling large numbers of out of order and missing events. See, for example: FSMonitor: Scalable File System Monitoring for Arbitrary Storage Systems, by Paul et al, IEEE, 2019; and Efficient Metadata Indexing for HPC Storage Systems, by Paul et al, IEEE, 2020.

Thus, a need exists for an improved mechanism for maintaining catalogs of information (metadata) which addresses the aforementioned issues.

SUMMARY

The appended claims may serve as a summary of the invention.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
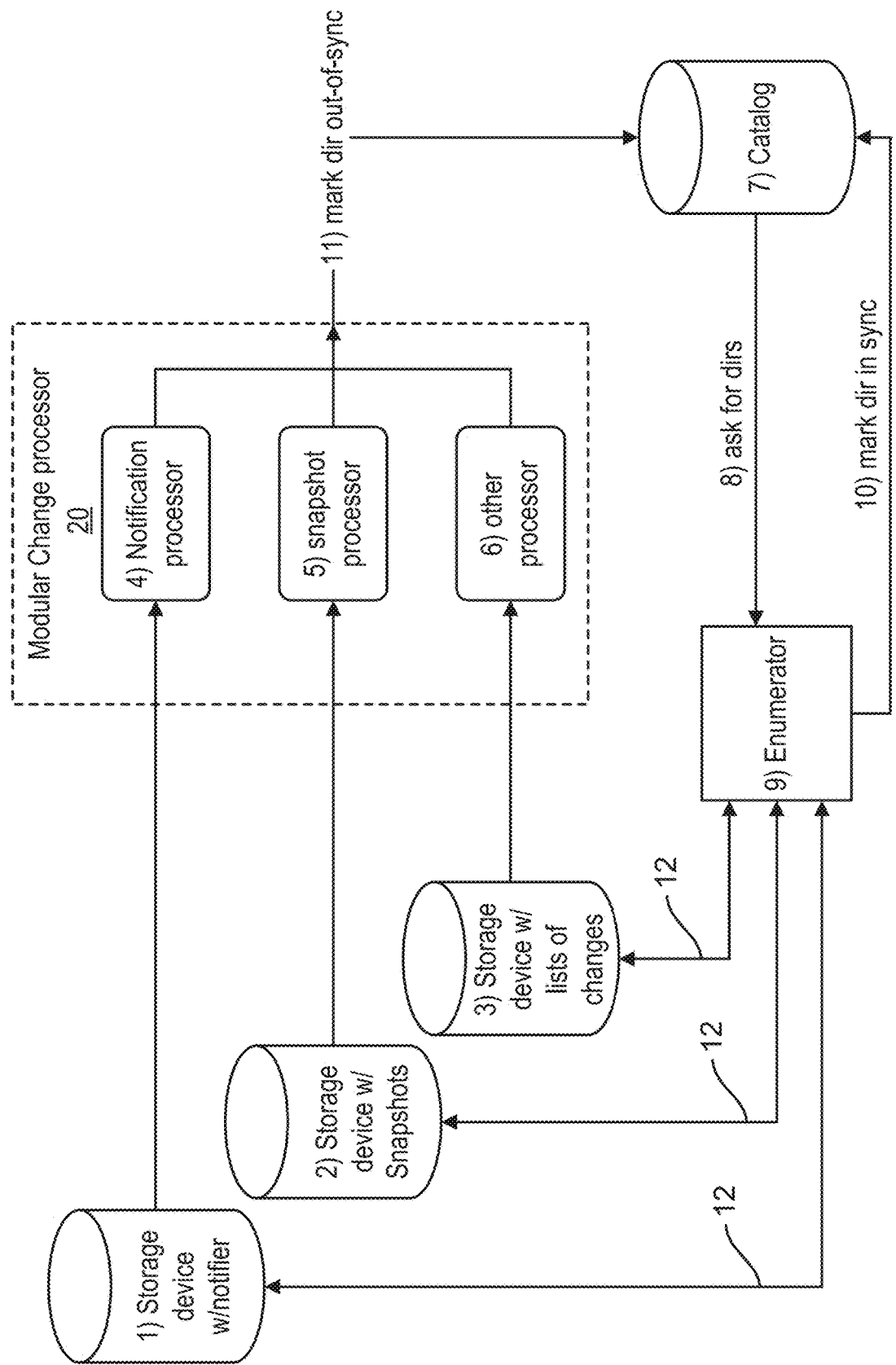
FIG. 1 is a functional block diagram of a catalog maintenance system and method implemented by one or more computers in one or more networks according to embodiments of the invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural, and system changes may be made without departing from the spirit and scope of the present invention. In addition, well-known structures, circuits, and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "a computer" includes a plurality of computers. In another example, reference to "an enumerator" includes a plurality of such enumerators.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Where used in this disclosure, the term "file system" or "filesystem" refers to a database (also referred to interchangeably as an index, and/or volume) containing the physical location of data on the device. The data is usually organized in folders called directories, which can contain other folders and files. The file system is thus used to control how data is stored and retrieved. Directories and files are given properties (such as 'read only') and access permissions. Moreover, as used herein, the term "file system" or "filesystem" encompasses substantially any type of file storage approach or file storage system, including object storage, AWS/S3 buckets, etc., with "file" intending to encompass files, objects, storage blobs, and any other file-like designation for data stored in a hierarchical structure.

As used herein, the term "computer" is meant to encompass a workstation, personal computer, tablet, wireless telephone, or any other suitable computing device including a processor, a computer readable medium upon which computer readable program code (including instructions and/or data) may be disposed, and a user interface. Terms such as "server", "application", "engine", "component", "module", "agent", and the like are intended to refer to a computer-related entity, including hardware or a combination of hardware and software. For example, an engine may be, but is not limited to being: a process running on a processor; a processor including an object, an executable, a thread of execution, and/or program; and a computer. Moreover, the various computer-related entities may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

General Overview

A catalog of file data is maintained to allow reporting, data analytics, metadata retention and search, and actions on files stored in a file system, among other things. The catalog should be kept up to date to be most useful, and the continually growing size of file system(s) under management means that simply obtaining an accurate inventory is often a significant challenge. With tens of billions of files, it is desirable to have an efficient process for ingesting changes to the catalog.

An aspect of the present invention was the realization by the inventors that even with state-of-the-art computational resources, the process of enumerating entire file systems containing billions of objects may take days to complete, which would substantially prevent one from gaining real-time insights, while tying up resources that may be better used elsewhere. These issues are exacerbated, and potentially become untenable, when catalogs are maintained by frequently repeating the process of enumerating the entire file system.

The inventors have also recognized that alternative mechanisms to maintain the catalog, such as: those that use event streams directly (e.g., ingesting native event notifications) as provided by file systems and file stores such as Lustre, CEL, iNotify on Linux, USN Journal on Windows, StorNext, BeeGFS, and SNS for AWS; or those that use generic event stream change notifications or differencing engines such as those providing snapshots or policy based differences for file systems such as Isilon OneFS, GPFS, Qumulo, and ZFS; are problematic in many applications.

The inventors have recognized that it may be difficult, if not impossible, to maintain accurate catalogs using conventional approaches: when events are missed, metadata for events is missed, or events are captured out of order. For example, a large number of changes, such as made by an HPC user creating a billion temporary files that are quickly removed, causes twice that number of events to be processed in "direct event processing" approaches. This scenario is not unusual, as event streams typically generate numbers of events that are many times greater than the number of events that are actually of interest. There may be read, write, and close events which provide no value for catalog maintenance, but which may also swamp all other events in number, leading to high CPU processing overhead and the need for use of relatively expensive processing systems. This use of native event notifications may thus result in catalog entries that are missing or incorrect, and/or large bottlenecks when attempting to process the events in order. In large event storms, processing such large volumes of events may result in the file system attempting to send more events than can be processed, causing the file system to become locked up to all activity, which is a severe failure scenario. Event processing systems should not cause harm to the system that they are monitoring.

Turning to FIG. 1, embodiments of the present invention address these problems by coalescing (effectively aggregating) events taking place within the directories (or within prefixes for an object-based collection), marking these directories or prefixes as 'out-of-sync' or stale. It is noted that the events represent changes made to the contents of filesystems 1, 2, 3. For example, a notification of some changed metadata is received by MCP 20 for /dir1/dir2/file1 (could be any metadata pertaining to anything, e.g., file size, owner, etc.); and a notification is also received shortly thereafter by MCP 20 for /dir1/dir2/file2. Both of these notifications constitute 'events' as used herein. Since these events are both targeted to the same directories (/dir1/dir2), these directories are marked 'out-of-sync' once at 11, i.e., these events are effectively coalesced (e.g., aggregated) into a single marking activity. This coalescing is possible because embodiments of the invention simply mark the directory(ies) with a status indicator, e.g., 'out-of-sync', which is accurate regardless of how many changes have been made to a given directory over any particular period of observation.

Embodiments of the present invention additionally include a timestamp with the out-of-sync mark, which represents a significant improvement in many applications. The inventors have recognized that simply marking a directory as out-of-sync (e.g., the Boolean True or False), may be insufficient in some applications due to entries becoming stale, e.g., directories being marked in_sync and out_of sync multiple times due to multiple events.

Instead, embodiments of the invention use a property 'out-of-sync-time', which is set with a timestamp. If 'out-of-sync-time'>'sync-time', the catalog entry is stale, else the entry is current.

An exemplary use of the timestamp is shown with reference to FIG. 1, in which enumerator 9 will: (a) at 8, ask the catalog 7 for identification of the 'out-of-sync' directories of file systems 1, 2, 3 by querying for directories in which out-of-sync-time is greater than sync-time (and/or directories having out-of-sync-time marks without any sync-time marks); (b) at 12, enumerate the contents of each identified 'out-of-sync-time' directory; (c) at 10, update the catalog 7

(e.g., with corrected metadata), and mark the directory that had previously been marked 'out-of-sync-time', as 'in-sync' with a current timestamp (e.g., 'sync-time'). The inventive process thus involves replacing the stale metadata in catalog 7 with updated metadata generated by the enumerator 9 after the modular change processor 20 causes the stale metadata in catalog 7 to be marked out-of-sync at 11.

It is noted that in particular embodiments, the process of coalescing serves to mark directories (not merely files) 'out-of-sync' in one process at 11. Subsequently, an agent (enumerator 9) scans the directories in a process that is separate and distinct from the coalescing process. The marks placed on the metadata of catalog 7 effectively serve as the interface between these two processes.

This approach, advantageously serves to:
(a) avoid problems that occur when events come out of order (it doesn't matter if /a/b/c gets updated first or /a/b gets updated first) because the system simply marks the affected directories 'out-of-sync' in the initial coalescing process as discussed above;
(b) avoid issues associated with missing events by scanning the entire affected directory;
(c) avoid adversely impacting the targeted storage device by focusing on those areas where changes are known to have occurred;
(d) avoid issues associated with a directory being marked out_of_sync multiple times but missing important details because of lack of distinction (Boolean vs timestamp); and
(e) provide substantially real-time data for insights and analysis.

It should be noted that the inventive concept is not simply that of updating the catalog 7, but rather, includes the use of directories in a manner that allows for a substantial amount of 'event compression' (i.e., coalescing) to avoid the aforementioned problems associated with conventional approaches for ingesting events. For example, if 1,000,000 files are added to a single directory, the inventive system generates only a single event, for a 1 million to 1 reduction as compared to conventional approaches, since instead of identifying each of the 1,000,000 changes to the directory, the system effectively captures them all with a single 'directory out-of-sync' mark.

Also, embodiments of the invention may include multiple enumerators and catalogs that are not tightly synchronized with time of day. In order to avoid problems with keeping synchronized time between catalog 7 and modular change processor 20, these embodiments add a tolerance to out-of-sync time by considering directories as stale only when out-of-sync-time+tolerance>sync_time.

It should also be recognized that an added benefit of these embodiments is that less processing overhead is required relative to conventional approaches because it's not necessary to process events and ingest them at the speed they are generated. In other words, events may be processed asynchronously, rather than in real-time. For example, consider a system in which events are generated regarding metadata updates: /dir1/dir2/file1 is added; /dir1/dir2/file2 is added; and /dir1/dir2/dir3 directory is added. (Both new files and new directories are added.) In a conventional approach, the 2nd and 3rd events may be lost in transmission, so that the metadata catalog misses these 2 events (including, potentially, other events occurring in dir3). However, embodiments of the present invention avoid this problem by effectively coalescing the three events into a single event, namely, that of marking/dir1/dir2 'out-of-sync'. The enumerator 9 then asks catalog 7 to identify which directories are 'out-of-sync', to which the catalog responds with "dir1/dir2" at 8. The enumerator 9 then gets a listing at 12 from the corresponding filesystem containing dir1/dir2 which contains dir3, file1, and file2, so that nothing is missed. In another example, suppose /dir1/foo is a file. Somebody removes it and replaces it with a directory in exactly the same place, so now /dir1/foo is a directory. The event stream could say that the /dir1/foo remove event is first followed by dir1/foo directory creation event. Or, the event stream may provide this information out of order, which would mean something completely different. The described embodiments are effectively immune from such out of order events because the parent (dir1) of the event is scanned after being marked 'out-of-sync', to identify the net changes categorically.

Figure 2:
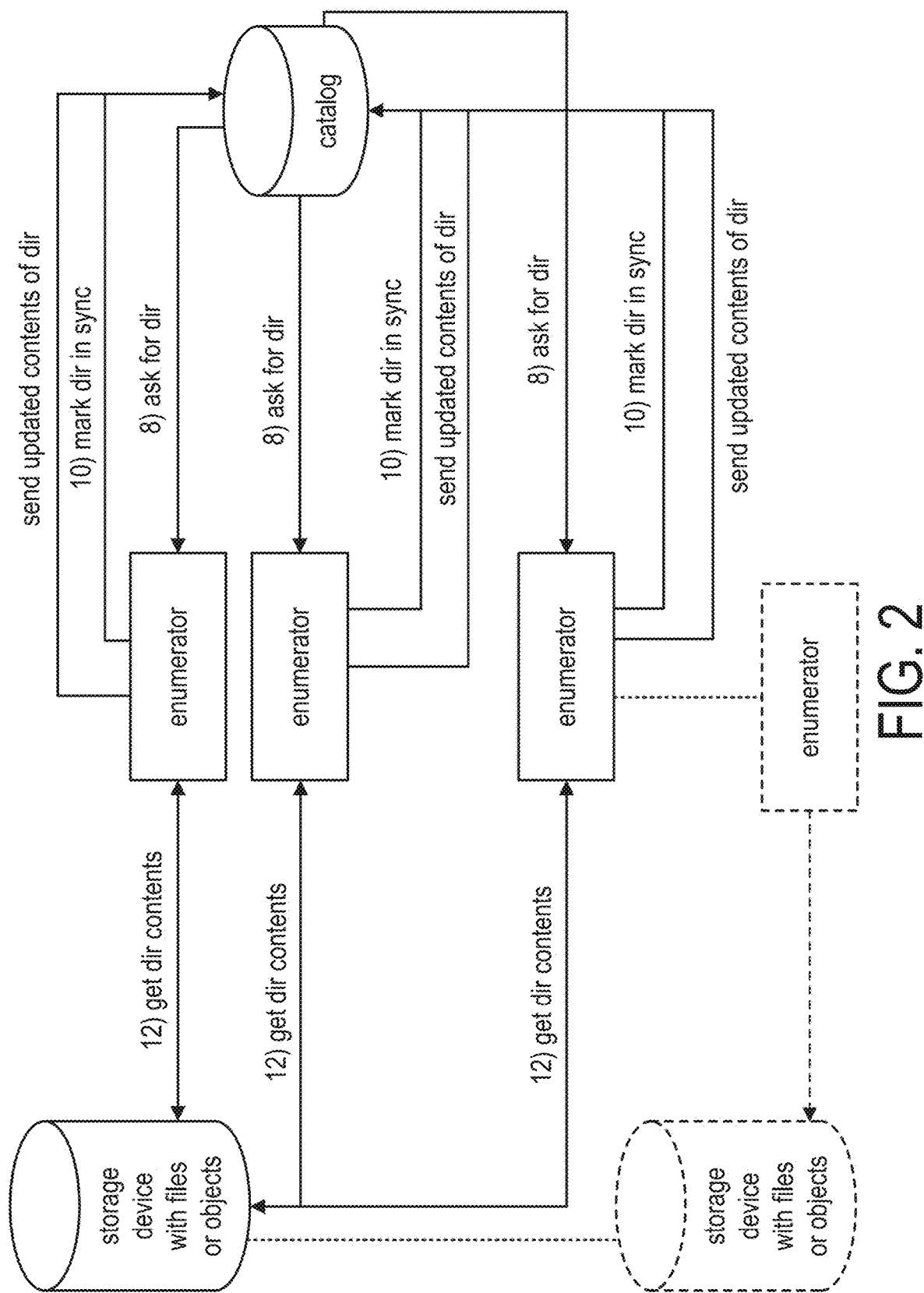
FIG. 2 is an expanded view of a portion of the embodiments of FIG. 1.
Figure 3:
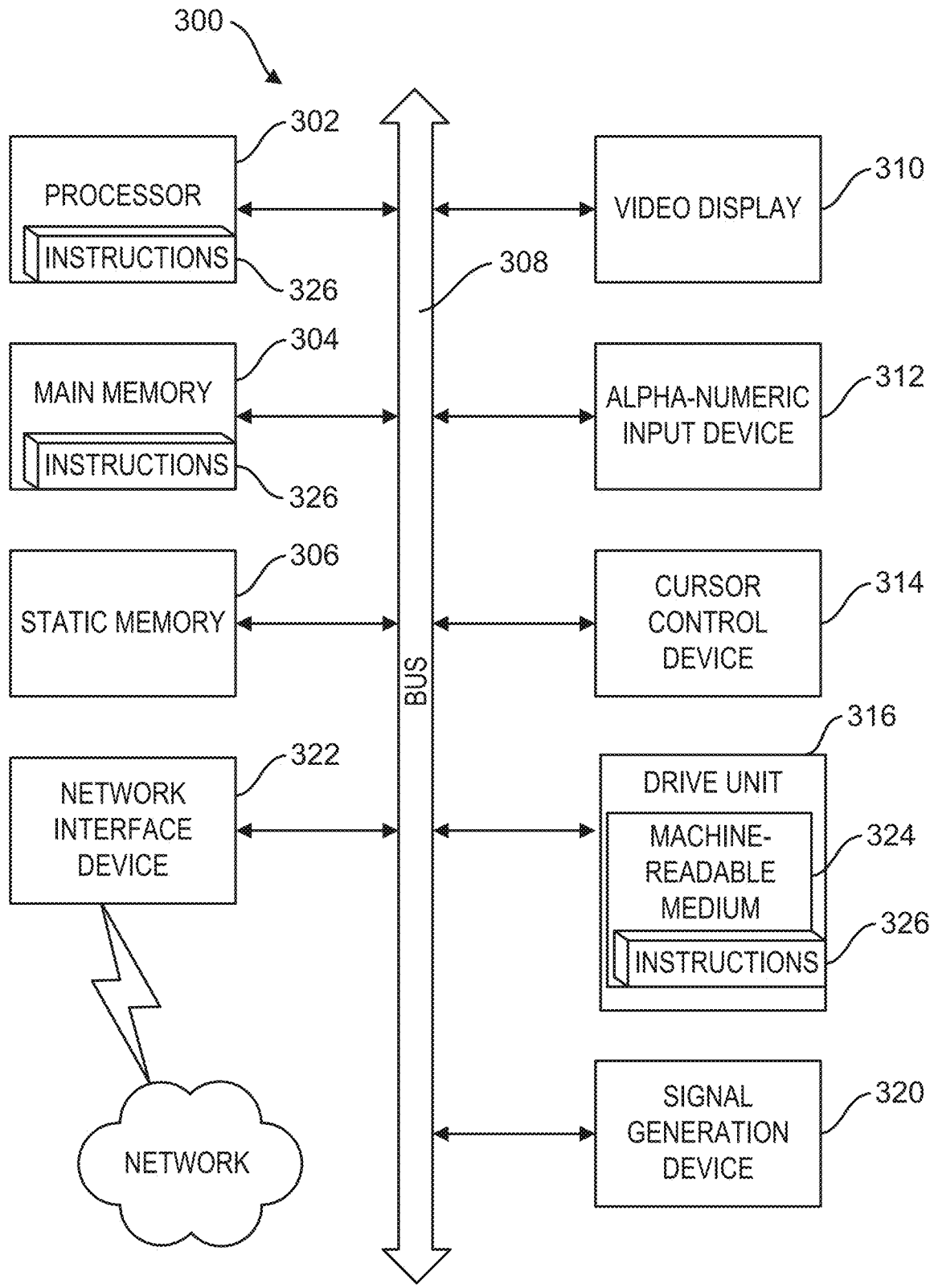
FIG. 3 is a schematic view of a typical computing system which may be used for aspects of the embodiments of FIGS. 1 & 2.

Referring now to FIGS. 1-3, embodiments of the present invention will be described in greater detail. As shown in FIG. 1, catalog 7 is populated with hierarchical metadata about items on a file store. The initial population may be accomplished by any number of conventional approaches. Once population of this catalog is complete, embodiments of the present invention are used to keep the catalog up to date.

Modular change processor 20 is configured to accept change notifications in various formats. For example, the changes may be from a file system 1 that generates events with a notifier (real-time notifications), e.g. Lustre (lustre.org); from a file system 2 that generates snapshots of differences (events having taken place over a predetermined interval), e.g. Isilon OneFS (Dell, Inc., Round Rock, TX), GPFS (IBM, Armonk, NY); from a file system 3 having a policy based event processor, e.g., that generates lists of changes via a notification queue; and/or substantially any other signaling mechanism capable of indicating that a change took place in a storage device. Agents 4, 5, 6 within processor 20 are associated with these different event streams and their particular formats, to process and effectively translate to a normalized format.

Modular change processor 20 identifies the directories within which the incoming event occurred, and at 11, marks these directories 'out-of-sync' in the catalog 7. Modular change processor 20 thus coalesces events affecting the same directories so that the directories are only marked once. A previously marked directory remains marked.

In particular embodiments, if a major change is detected (e.g., swapped directories at a high level, or directory renamed), then entire trees are marked 'out-of-sync' with a special 'tree-out-of-sync' timestamp. This causes all of the directories in that tree to be marked 'out-of-sync'. If, subsequently, another 'out-of-sync' event comes in for a marked directory, nothing extra needs to be done other than updating the 'out-of-sync' timestamp. Consider, for example, tree /a with subdirectories /a/micro, /a/macro, and /a/intro getting swapped with tree /b with subdirectories /b/micro, /b/supera, and /b/ultra. The fact that /a and /b may have any number of (or none) overlapping dirs doesn't matter, the entire /a and /b trees get marked as tree-out-of-sync and get rescanned recursively, all the way down, to mark each of the subdirectories 'out-of-sync'.

The enumerator 9 receives, at 8, the identities, from catalog 7, of any directories that are marked 'out-of-sync'. Enumerator 9 then enumerates, at 12, the contents of those directories at filesystems 1, 2, 3, non-recursively or recursively, as needed, (e.g., by a targeted crawl of those 'out-of-sync' or 'tree-out-of-sync' directories), and updates, at 10, the catalog 7 metadata associated with those directories and marks each directory as 'in-sync' along with the time (e.g., timestamp). If new, previously unknown, directories are discovered in this step, they are added to the queue of 'out-of-sync' directories to enumerate. For example, if directory /a/b is added, embodiments mark /a as out-of-sync. If directory /a/c is added but this event is lost, or delayed, it will be 'previously unknown', but will be added automatically when /a, which is marked out-of-sync, is scanned/enumerated. It should be noted that enumeration may handled by any one or more of a plurality of enumerators 9 working independently, as shown and described with respect to FIG. 2, hereinbelow. This process is repeated indefinitely as needed:

1. Retrieve directories marked 'out-of-sync' (including 'tree-out-of-sync') at 8;
2. Enumerate these directories for contents at 12;
3. Add any new, unknown child directories to the queue by marking ('out-of-sync-time'), and repeat (1) and (2); and
4. Update these directories 'in-sync-time' at 10.

Out-of-Sync Coalescing and Ingestion—Modular Change Processor Algorithms

The following algorithms demonstrate simplified pseudo-code for embodiments using different change monitors to coalesce events and mark directories out-of-sync.

File System 1: Change Log/Notifier Ingestion (e.g. Lustre)
1. loop until stopped:
   a. gather 1,000,000 events and loop:
      i. analyze and filter events (file/dir added/remove/changed) and throw out unnecessary ones (e.g. read, open, close)
      ii. if event path is a directory
         1. if event is rename or move of this directory
            a. create memory marker for new destination directory name as tree-out-of-sync
            b. create memory marker for parent of source directory as out-of-sync
            c. create memory marker for parent of destination directory as out of sync
         2. else (new, modified, etc.)
            a. create memory marker for parent directory as out-of-sync
      iii. else (not a directory)
         1. if event is rename of file (includes source and destination)
            a. get parent directory for source and destination filename of the move or rename
            b. create memory marker for both parent directories as out-of-sync
         2. else (not a rename)
            a. get parent for object in 1.a.iii
            b. create memory marker for parent 1.a.iii.2. as out-of-sync
   b. for all dir markers in 1:
      i. make sure list is de-duplicated
      ii. mark dir in catalog out-of-sync or tree-out-of-sync, as appropriate, with timestamp File System 2: Snapshot-Based Event Processor (e.g., OneFS)
1. loop until stopped
   a. process snapshot differences:
      i. take snapshot
      ii. if previous snapshot exists, take difference of 2 snapshots "alpha" and "beta"
      iii. if the swap of two directories is detected, this is handled as a special case and each candidate directory is marked as tree-out-of-sync
      iv. collect parent directories of changed items identified in 1.a.ii
      v. create de-duplicated memory marker for parents 1.a.iii
   b. for unique, deduplicated, dir markers in 1.a.
      i. mark directories out-of-sync or tree-out-of-sync, as appropriate, with timestamp File System 3: Policy Based Event Processor (e.g., GPFS)
1. loop until stopped
   a. collect and process differences
      i. run GPFS policy scan looking for items with new "change time" or "modified time" since previous policy scan
      ii. collect and de-duplicate parent directory of items in 1.a.i.
      iii. create memory marker for parent items from 1.a.ii
   b. for unique dir markers in 1.a.iii.
      i. mark dir out-of-sync with timestamp For other types of differencing engine, a similar approach applies.

1. Events/actions get processed (as a stream or as differences between 2 points in time)
2. Parent directories are extracted and deduplicated
3. Directories are marked out-of-sync for scanning
4. Any special cases are handled as needed (such as directory swaps or renames) and marked as tree-out-of-sync Enumerator Algorithm One or more enumerators may be running concurrently, as shown in FIG. 2, to keep the catalog up to date. The simplified algorithm that they use is as follows:

Loop Until Stopped
1. Ask catalog 7 for directory with out-of-sync-time>sync-time at 8
2. Enumerator 9 receives directory listing of directories identified in step 1 from storage device at 12
3. Update catalog 7 with new directory listing
   a. If any new (previously unknown) items in directory are themselves directories, add these sub-directories as new directories to the catalog 7 and mark them as out-of-sync with timestamp
4. Update catalog 7 with sync-time=current time on directory obtained in 2.

Turning now to FIG. 2, various embodiments include a plurality of enumerators 9 operating on one or more machines to enumerate multiple storage devices 1, 2, 3, etc., in coordination, to update the catalog 7. It should also be recognized that catalog 7 may collectively reside on multiple machines. Similarly, enumerators 9 may exist on one or more machines with one or more different operating systems. Other aspects of the system including MCP 20 and catalog 7 may likewise be in one or multiple machines.

FIG. 3 shows a diagrammatic representation of a machine in the exemplary form of a computer system 300 within which a set of instructions, for causing the machine to perform any one of the methodologies discussed above, may be executed. In alternative embodiments, the machine may include network router(s), network switch(es), network bridge(s), web appliance(s), or any machine(s) capable of executing a sequence of instructions that specify actions to be taken by that machine. The exact nature of the machine is unimportant for the embodiment and may exist on any hardware running a compatible operating system capable of running instructions.

The exemplary computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker), and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules, or by functional names, without loss of generality. It should be noted that the process steps and instructions of the present invention could be embodied in software, firmware, or hardware, and when embodied in software, could be downloaded to reside on and be operated from different platforms used by real time network operating systems. Moreover, the particular naming of the components, capitalization of terms, the attributes, data structures, or any other programming or structural aspect is not mandatory or significant, and the mechanisms that implement the invention or its features may have different names, formats, or protocols.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. It should be further understood that any of the features described with respect to one of the embodiments described herein may be similarly applied to any of the other embodiments described herein without departing from the scope of the present invention. As used in this document, "each" refers to each member of a set or each member of a subset of a set.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Moreover, unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission, or display devices.

Embodiments of the present invention also relate to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible, non-transitory, computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), any other appropriate static, dynamic, or volatile memory or data storage devices, or other type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for disclosure of enablement and best mode of the present invention.

Various systems may also be used with programs in accordance with the teachings herein, or it may prove convenient to construct more specialized apparatus to perform the required method steps. The required structure for a variety of these systems will be apparent to those of skill in the art, along with equivalent variations.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Finally, it should be noted that the language used in the specification has been principally selected for readability and instructional purposes and may not have been selected to delineate or circumscribe the inventive subject matter. Accordingly, the disclosure of the present invention is intended to be illustrative, but not limiting, of the scope of the invention, which is set forth in the following claims. It should be further understood that any of the features described with respect to one of the embodiments described herein may be similarly applied to any of the other embodiments described herein without departing from the scope of the present invention.

Having thus described the invention, what is claimed is:

1. A system for maintaining a comprehensive catalog of metadata records that describes hierarchical file data held in one or more file systems, the system comprising:
    a Modular Change Processor (MCP) communicably couplable to one or more specialized file systems containing hierarchical file data, and to a catalog containing metadata corresponding to the hierarchical file data;
    an Enumerator Computer (EC) communicably couplable to the catalog and to the one or more specialized file systems;
    the MCP having a first memory, a first processor, and a first stored program in the first memory executable by the first processor, the first stored program configured to:
    (a) cause the MCP to capture event notifications in one or more native formats generated by the one or more specialized file systems, the event notifications pertaining to contents of affected directories within the hierarchical file data;
    (b) cause the MCP to translate the event notifications into a common format;
    (c) cause the MCP to coalesce the translated event notifications into one or more coalesced notifications for particular ones of the affected directories; and
    (d) cause the MCP to use the coalesced notifications to generate and transmit to the catalog, instructions to mark metadata corresponding to the affected directories as 'out-of-sync' independently of any reference to the contents of the affected directories;
    the EC having a second memory, a second processor, and a second stored program in the second memory executable by the second processor, the second stored program configured to:
    (e) cause the EC to receive from the catalog, identities of directories having metadata marked 'out-of-sync' (the 'out-of-sync' directories) independently of any reference to the contents of the affected directories;
    (f) cause the EC, after said cause (e), to receive; from the one or more specialized file systems, updated contents of the 'out-of-sync' directories;
    (g) cause the EC to generate replacement metadata for the updated contents; and
    (h) cause the EC to send the replacement metadata to the catalog.

2. The system of claim 1, wherein each of said one or more coalesced notifications comprises an aggregation of a plurality of said event notifications affecting a particular directory.

3. The system of claim 2, wherein each of said one or more coalesced notifications comprises a status indicator for the particular directory.

4. The system of claim 3, wherein each of said one or more coalesced notifications comprises a status indicator with a timestamp, for the particular directory.

5. The system of claim 4, wherein said cause (d) further comprises causing the MCP to use the coalesced notifications to generate and transmit to the catalog, instructions to mark metadata corresponding to the affected directories as 'out-of-sync' with an out-of-sync-time timestamp.

6. The system of claim 5, wherein said cause (e) further comprises causing the EC to receive from the catalog, identities of directories (identified directories) having metadata marked 'out-of-sync' (the identified 'out-of-sync' directories) with an out-of-sync timestamp plus any tolerance, is greater than any in-sync-time timestamp.

7. The system of claim 6, wherein said cause (f) further comprises causing the EC to receive, from the one or more specialized file systems, updated contents of the identified 'out-of-sync' directories.

8. The system of claim 7, wherein said cause (h) further comprises causing the EC to send the replacement metadata to the catalog and mark the identified 'out-of-sync' directories with an in-sync-time timestamp.

9. The method of claim 1, wherein the updated contents of the 'out-of-sync' directories of said cause (f) further comprises contents of any new directories.

10. The system of claim 1, wherein said cause (h) further comprises sending the replacement metadata to the catalog with instructions to replace the metadata marked 'out-of-sync' with corresponding replacement metadata and to mark the replacement metadata as 'in-sync' at a particular time.

11. The system of claim 1, wherein the native formats include one or more of: real-time notifications of events; snapshots of events having taken place over a predetermined time interval; lists of events having taken place over a predetermined time interval, and/or combinations thereof.

12. The system of claim 11, wherein the native formats include one or more of formats generated by: change log event processors; snapshot-based event processors; policy based event processors; and/or combinations thereof.

13. The system of claim 1, wherein said instructions to mark metadata corresponding to the affected directories as 'out-of-sync', further comprises instructions to mark metadata corresponding to a tree containing the affected directories as 'tree-out-of-sync'.

14. A method of maintaining a comprehensive catalog of metadata records that describes hierarchical file data held in one or more file systems, the method comprising:
    (a) configuring a Modular Change Processor (MCP) for being communicably coupled to one or more specialized file systems containing hierarchical file data, and to a catalog containing metadata corresponding to the hierarchical file data;
    (b) configuring an Enumerator Computer (EC) for being communicably coupled to the catalog and to the specialized file systems;
    (c) capturing, with the MCP, event notifications in one or more native formats generated by the one or more specialized file systems, the event notifications pertaining to contents of affected directories within the hierarchical file data;
    (d) translating, with the MCP, the event notifications into a common format;
    (e) coalescing, with the MCP, the translated event notifications into one or more coalesced notifications for particular ones of the affected directories;
    (f) with the MCP, using the coalesced notifications to generate and transmit to the catalog, instructions to mark metadata corresponding to the affected directories as 'out-of-sync' independently of any reference the contents of the affected directories;
    (g) with the EC, receiving from the catalog, identities of directories having metadata marked 'out-of-sync' (the 'out-of-sync' directories) independently of any reference to the contents of the affected directories;

(h) with the EC, after said receiving (g), receiving from the one or more specialized file systems, updated contents of the 'out-of-sync' directories;

(i) generating, with the EC, replacement metadata for the updated contents; and (j) sending, with the EC, the replacement metadata to the catalog.

15. The method of claim 14, wherein each of said one or more coalesced notifications comprises an aggregation of a plurality of said event notifications affecting a particular directory.

16. The method of claim 15, wherein each of said one or more coalesced notifications comprises a status indicator for the particular directory.

17. The method of claim 16, wherein each of said one or more coalesced notifications comprises a status indicator with a timestamp, for the particular directory.

18. The method of claim 17, wherein said step (f) further comprises using the coalesced notifications to generate and transmit to the catalog, instructions to mark metadata corresponding to the affected directories as 'out-of-sync' with an out-of-sync-time timestamp.

19. The method of claim 18, wherein said step (g) further comprises receiving from the catalog, identities of directories (identified directories) having metadata marked 'out-of-sync' (the identified 'out-of-sync' directories) with an out-of-sync timestamp plus any tolerance, which is greater than any in-sync-time timestamp.

20. The method of claim 19, wherein said step (h) further comprises receiving, from the one or more specialized file systems, updated contents of the identified 'out-of-sync' directories.

21. The method of claim 20, wherein said step (j) further comprises sending the replacement metadata to the catalog and marking the identified 'out-of-sync' directories with an in-sync-time timestamp.

22. The method of claim 14, wherein the updated contents of the 'out-of-sync' directories of said step (j) further comprises contents of any new directories.

23. The system of claim 14, wherein said step (j) further comprises sending the replacement metadata to the catalog with instructions to replace the metadata marked 'out-of-sync' with corresponding replacement metadata and to mark the replacement metadata as 'in-sync' at a particular time.

24. The system of claim 14, wherein the native formats include one or more of: real-time notifications of events; snapshots of events having taken place over a predetermined time interval; lists of events having taken place over a predetermined time interval, and/or combinations thereof.

25. The system of claim 24, wherein the native formats include one or more of formats generated by: change log event processors; snapshot-based event processors; policy based event processors; and/or combinations thereof.

26. The system of claim 14, wherein said instructions to mark metadata corresponding to the affected directories as 'out-of-sync', further comprises instructions to mark metadata corresponding to a tree containing the affected directories as 'tree-out-of-sync'.

* * * * *